United States Patent [19]

Fujii et al.

[11] Patent Number: 5,545,870
[45] Date of Patent: Aug. 13, 1996

[54] ELECTRICAL DISCHARGE MACHINING METHOD AND APPARAUS WITH NON-LOAD TIME CALCULATION

[75] Inventors: Akira Fujii, Tokyo; Kiyoshi Kaneda, Kanagawa, both of Japan

[73] Assignees: NEC Corporation; Makino Milling Machine Co., Ltd., both of Tokyo, Japan

[21] Appl. No.: 399,507

[22] Filed: Mar. 7, 1995

[30] Foreign Application Priority Data

Mar. 9, 1994 [JP] Japan ..................... 6-065732

[51] Int. Cl.$^6$ ............... B23H 1/02; B23H 7/18
[52] U.S. Cl. .................. 219/69.13; 219/69.16
[58] Field of Search .............. 219/69.12, 69.13, 219/69.17, 69.18, 69.19, 69.16

[56] References Cited

U.S. PATENT DOCUMENTS

| 2,979,639 | 4/1961 | Williams et al. | 219/69.18 |
| 3,916,138 | 10/1975 | Pfau | 219/69.13 |
| 4,292,490 | 9/1981 | Bell, Jr. et al. | 219/69.18 |
| 4,703,144 | 10/1987 | Goto et al. | 219/69.18 |
| 5,276,301 | 1/1994 | Kohsaka et al. | 219/69.12 |
| 5,410,118 | 4/1995 | Boccadoro | 219/69.16 |

FOREIGN PATENT DOCUMENTS

| 3416249 | 11/1984 | Germany | 219/69.13 |
| 50-1499 | 1/1975 | Japan . | |
| 2-76625 | 3/1990 | Japan | 219/69.16 |
| 2-109633 | 4/1990 | Japan . | |

Primary Examiner—Geoffrey S. Evans
Attorney, Agent, or Firm—Ostrolenk, Faber, Gerb & Soffen, LLP

[57] ABSTRACT

An electrical discharge machining method includes the steps of intermittently applying a voltage pulse to an electrical discharge machining gap between a machining electrode and a work in accordance with predetermined ON and OFF times to generate discharge, relatively moving the machining electrode and the work during generation of discharge to perform electrical discharge machining, detecting a discharge frequency during electrical discharge machining, calculating a nonload time by subtracting the predetermined ON and OFF times from a discharge repetition period based on the detected discharge frequency, and controlling a relative position between the machining electrode and the work on the basis of the calculated nonload time.

15 Claims, 5 Drawing Sheets

FIG.2A
INTERELECTRODE VOLTAGE
FIG.2B
DISCHARGE START SIGNAL
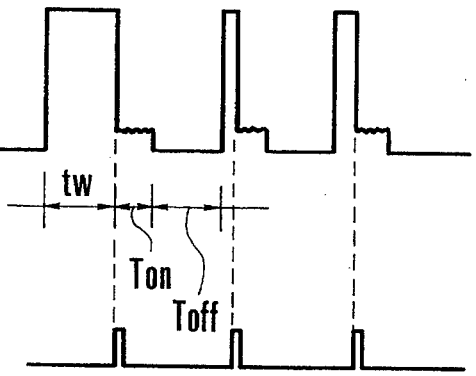
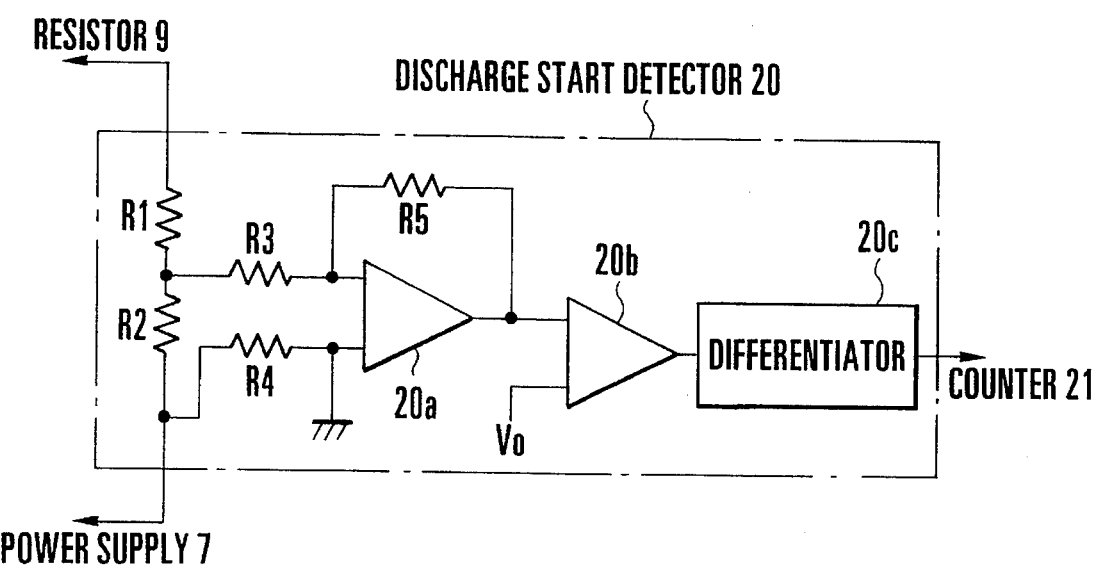
FIG.3

BEFORE MACHINING

AFTER MACHINING

ELECTRICAL DISCHARGE MACHINING METHOD AND APPARAUS WITH NON-LOAD TIME CALCULATION

BACKGROUND OF THE INVENTION

The present invention relates to an electrical discharge machining method and apparatus and, more particularly, to an electrical discharge machining method and apparatus which can realize stable servo feed machining even in a high-frequency area for finishing or the like.

In electrical discharge machining, a voltage pulse is applied between an electrode and a work (machining gap) to generate discharge therebetween, and predetermined ON time ($T_{on}$) and OFF time ($T_{off}$) are repeated, thereby machining the work. Generally, a time from application of the voltage pulse to the start of discharge is called a nonload voltage application time (to be simply referred to as a "nonload time" hereinafter). The ON time ($T_{on}$) corresponds to a time from the start of discharge to the completion of discharge, and the OFF time ($T_{off}$) corresponds to a time from the completion of discharge to the next application of a voltage pulse.

To stably maintain the discharge, the relative feeding speed between the electrode and the work need to be controlled (servo feed). As feeding speed control of this type, a method has been conventionally known in which interelectrode voltages (pulse voltages) generated in the machining gap are averaged using a filter circuit, and the feeding speed is controlled to set an average voltage to a predetermined value. Another method is also proposed in which the nonload time is directly counted by using a clock pulse or the like, and the feeding speed is controlled on the basis of the obtained nonload time (Japanese Patent Laid-Open Nos. 50-1499 and 2-109633).

In the method in which the average voltage of interelectrode voltages is detected using a filter circuit, the average voltage of the interelectrode voltages changes depending on its duty ratio (ratio of the nonload time during one period). In a machining area with a high discharge frequency (for finishing or the like), a machining method is generally used in which the nonload time is shorter than the OFF time and the like. In this case, the duty ratio becomes small, the average voltage value also largely decreases, and the resolution is degraded, resulting in difficulty in performing stable servo feed on the basis of the average voltage.

On the other hand, the method in which the nonload time is directly counted can be applied without any problem in a rough machining area with a relatively low discharge frequency. However, in a finishing area where the discharge frequency is as high as 1 MHz, the nonload time is greatly shortened. The circuit arrangement for counting the nonload time is highly complicated, and the counting precision is undesirably degraded. Additionally, in this method, the nonload time is counted and measured at a predetermined sampling period. For this reason, if the discharge frequency varies, the nonload time cannot always be accurately measured although no problem is posed at a predetermined discharge frequency.

According to the above conventional methods, stable servo feed machining cannot be performed in a high-frequency area for finishing or the like, so constant-speed feed machining is performed in many cases.

SUMMARY OF THE INVENTION

It is an object of the present invention to provide an electrical discharge machining method and apparatus which can accurately control an electrical discharge machining gap on the basis of a nonload time.

It is another object of the present invention to provide an electrical discharge machining method and apparatus which can realize stable servo feed even in an area with a high discharge frequency.

In order to achieve the above object, according to the present invention, there is provided an electrical discharge machining method comprising the steps of intermittently applying a voltage pulse to an electrical discharge machining gap between a machining electrode and a work in accordance with predetermined ON and OFF times to generate discharge, relatively moving the machining electrode and the work during generation of discharge to perform electrical discharge machining, detecting a discharge frequency during electrical discharge machining, calculating a nonload time on the basis of the detected discharge frequency, and controlling a relative position between the machining electrode and the work on the basis of the calculated nonload time.

BRIEF DESCRIPTION OF THE DRAWINGS

FIGS. 2A and 2B are charts showing the waveforms of an interelectrode voltage and a discharge start signal of the apparatus in FIG. 1, respectively;

FIG. 3 is a block diagram of a discharge start detector shown in FIG. 1;

DESCRIPTION OF THE PREFERRED EMBODIMENTS

An electrical discharge machining apparatus of the present invention will be described with reference to the accompanying drawings.

Figure 1:
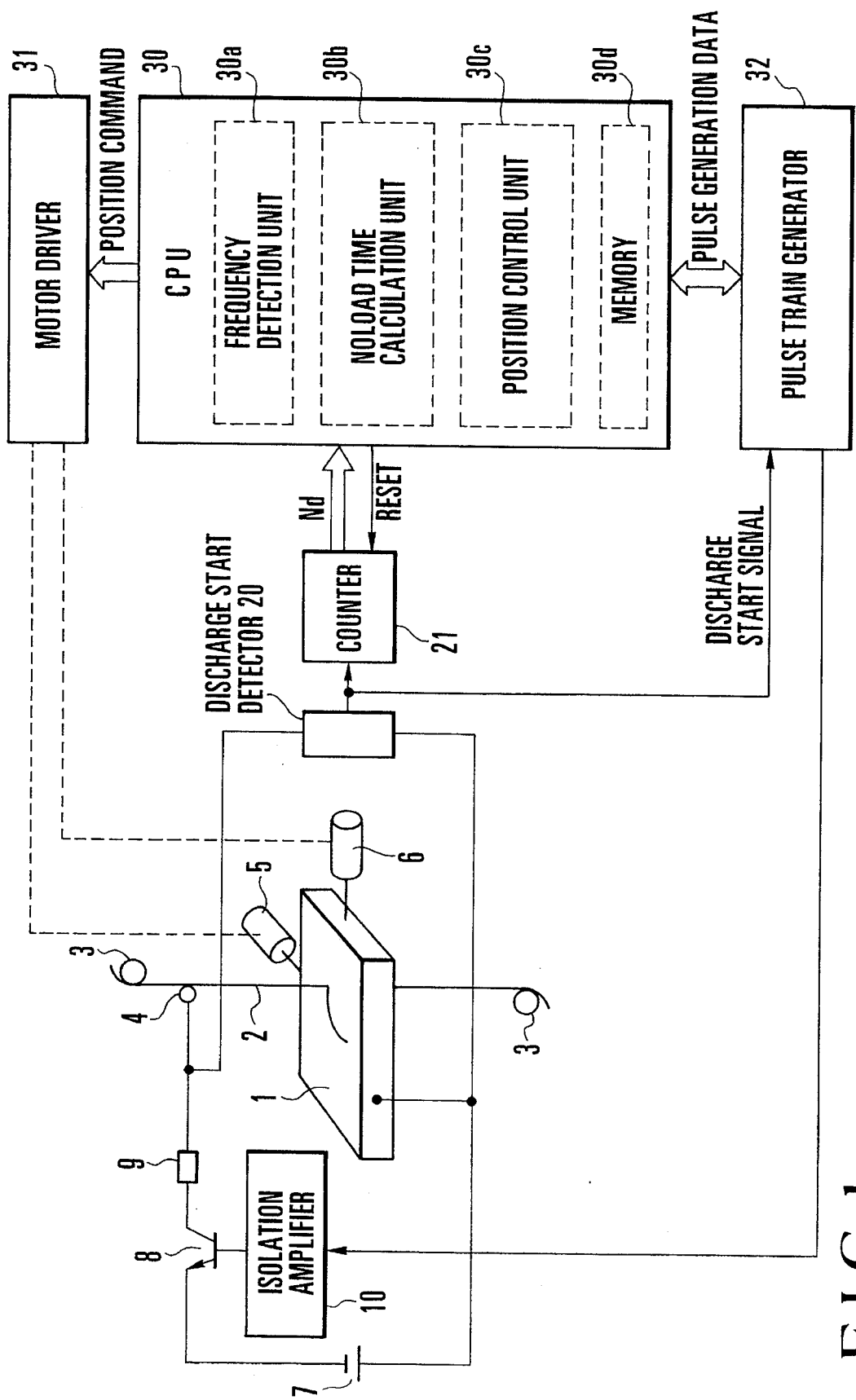
FIG. 1 is a block diagram showing an electrical discharge machining apparatus according to the first embodiment of the present invention.

FIG. 1 shows a wire electrical discharge machining apparatus as an embodiment of the present invention. As a matter of course, the present invention is not limited to this embodiment and can also be applied, as an electrical discharge apparatus, to a diesinking electrical discharge machining apparatus in addition to the wire electrical discharge machining apparatus.

The relative position between a workpiece 1 and a wire electrode 2 is controlled by servomotors 5 and 6 along the X- and Y-axes, respectively. A machining gap is formed between the workpiece 1 and the wire electrode 2. The wire electrode 2 extends between guides 3. A voltage pulse is intermittently applied to the machining gap through a DC power supply 7, a switching element (transistor) 8, a resistor 9, and a feeder 4.

As shown in FIG. 2A, when a voltage pulse is applied to the machining gap to generate discharge, the interelectrode voltage decreases. As shown in FIG. 2B, when the interelectrode voltage becomes lower than a reference voltage, a discharge start detector 20 generates a discharge start signal. As shown in FIG. 3, the discharge start detector 20 is constituted by an operational amplifier 20a for dividing and receiving the interelectrode voltage, a comparator 20b for comparing the divided interelectrode voltage with a predetermined reference voltage $V_0$ and outputting a voltage when the interelectrode voltage becomes lower than the reference voltage $V_0$, and a differentiator 20c for differentiating the output from the comparator 20b. Reference symbols R1 to R5 denote resistive elements.

A CPU (Central Processing Unit) 30 is a controller for controlling the entire apparatus, which has a frequency detection unit 30a for detecting a discharge frequency during machining, a nonload time calculation unit 30b for subtracting ON and OFF times from the discharge repetition period based on the discharge frequency from the frequency detection unit 30a to calculate a nonload time, a position control unit 30c for driving the servomotors 5 and 6 through a motor driver 31 on the basis of the nonload time from the nonload time calculation unit 30b to control the relative position between the machining electrode 2 and the workpiece 1, and a memory 30d for storing an ON time $T_{on}$ and an OFF time $T_{off}$, both of which are set by a known data setting means in advance.

A pulse train generator 32 receives pulse generation data such as the ON time $T_{on}$, the OFF time $T_{off}$, and the like, which are stored in the memory 30d, from the CPU 30 to generate a predetermined pulse train. The pulse train generator 32 outputs this pulse train to an isolation amplifier 10, thereby turning on/off the switching element 8. More specifically, the pulse train turns on the switching element 8 during only the ON time $T_{on}$ after generation of a discharge start signal. Thereafter, the switching element 8 is turned off during only the OFF time $T_{off}$. After the elapse of the OFF time $T_{off}$, the switching element 8 is turned on again (FIG. 2B).

A counter 21 counts the number of pulses every time the discharge start signal is generated. The CPU 30 reads discharge pulse data $N_d$ as an output from the counter 21 every predetermined sampling period $T_{SAM}$. The counter 21 is reset upon reading the discharge pulse data.

A discharge frequency $f_m$, a nonload time $t_w$, the ON time $T_{on}$, and the OFF time $T_{off}$ satisfy a relationship represented by the following equation:

$$f_m \cdot (t_w + T_{on} + T_{off}) = 1 \tag{1}$$

The discharge frequency $f_m$ is calculated from the discharge pulse data $N_d$ and the sampling period $T_{SAM}$ and represented as follows:

$$f_m = N_d / T_{SAM} \tag{2}$$

Therefore, the nonload time $t_w$ is given as follows:

$$t_w = 1/f_m - (T_{on} + T_{off}) = T_{SAM}/N_d - (T_{on} + T_{off}) \tag{3}$$

Figure 4:
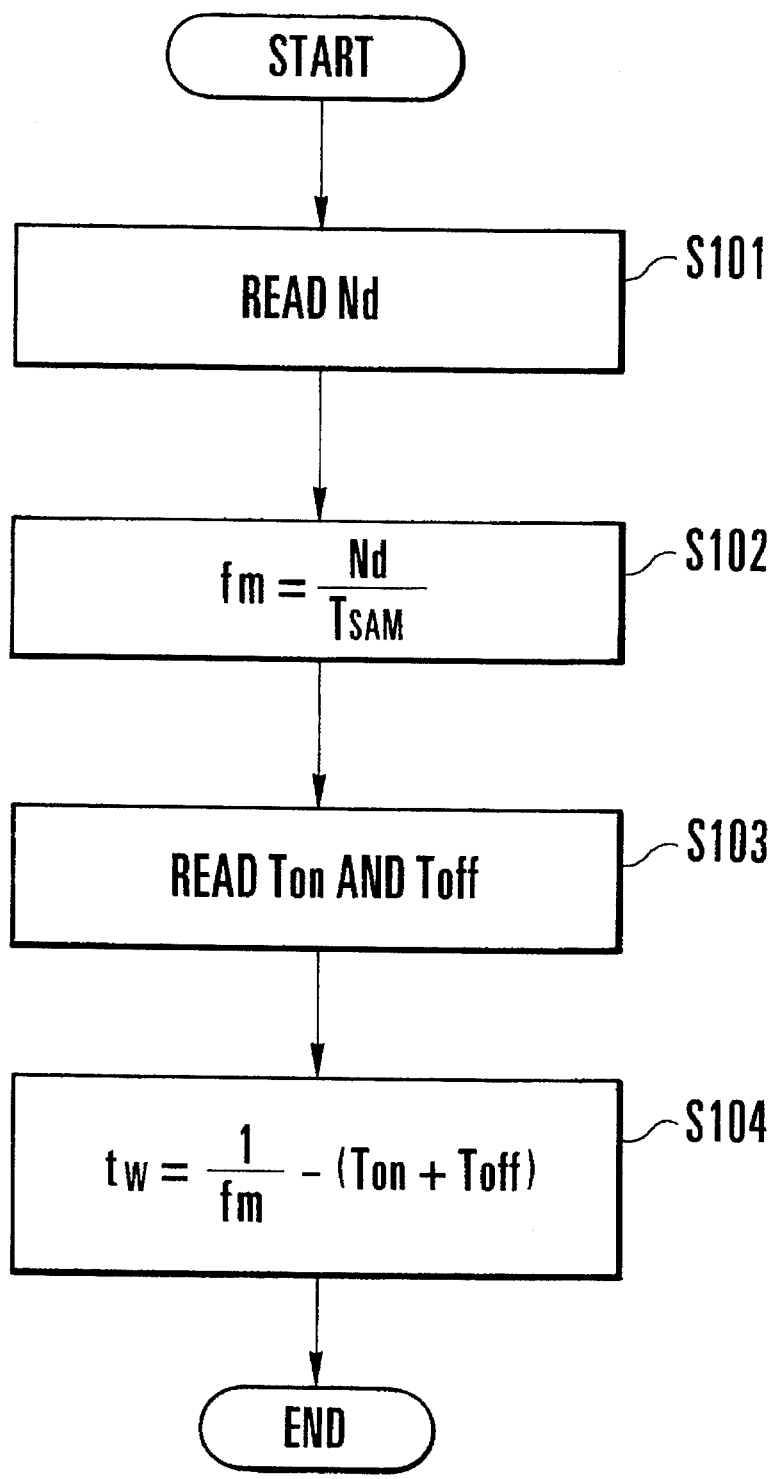
FIG. 4 is a flow chart for obtaining a nonload time.

The above procedures are shown in the flow chart of FIG. 4. The frequency detection unit 30a of the CPU 30 reads the output value $N_d$ from the counter 21 (step S101). The output value $N_d$ is divided by the sampling period $T_{SAM}$ to obtain the discharge frequency $f_m$ (step S102). Subsequently, the nonload time calculation unit 30b reads the times $T_{on}$ and $T_{off}$ from the memory 30d (step S103). The nonload time $t_w$ is calculated on the basis of equation (3) (step S104).

Figure 5:
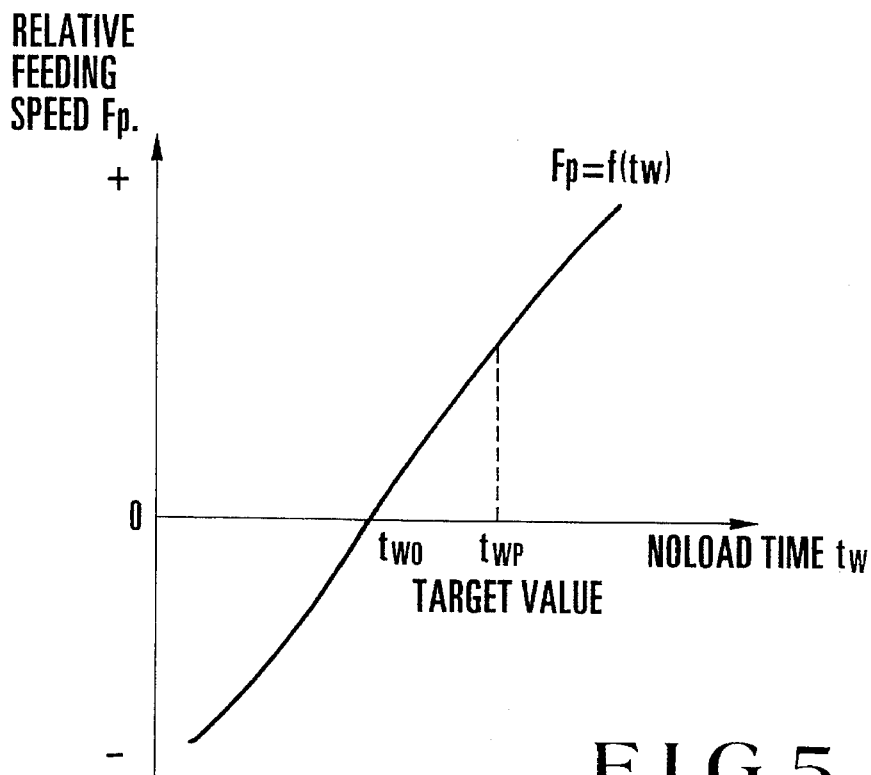
FIG. 5 is a graph showing a relationship between a nonload time $t_w$ and a relative feeding speed $F_p$ of an electrode and a work.

FIG. 5 shows a relationship between the nonload time $t_w$ and a relative feeding speed $F_p$ of the electrode 2 and the workpiece 1. This relationship can be arbitrarily set, and the feeding speed $F_p$ is determined on the basis of the relationship. Referring to FIG. 5, if $t_w = t_{w0}$, then $F_p = 0$, i.e., a stop state is set. If $t_w > t_{w0}$, then $F_p > 0$, i.e., a forward feed state is set. If $t_w < t_{w0}$, then $F_p < 0$, i.e., a backward feed state is set. In FIG. 5, when the nonload time $t_w$ is smaller than a target value $t_{wp}$, the feeding speed $F_p$ is low. For this reason, the machining amount increases, and the machining gap becomes larger. The nonload time $t_w$ gradually changes to be close to the target value $t_{wp}$. On the other hand, when the nonload time $t_w$ is larger than the target value $t_{wp}$, the feeding speed is high. For this reason, the machining amount decreases, and the machining gap becomes smaller. The nonload time $t_w$ gradually changes to be close to the target value $t_{wp}$. In this manner, the nonload time $t_w$ is eventually stabilized at the target value $t_{wp}$.

The position control unit 30c of the CPU 30 commands the feeding speed $F_p$ determined by the nonload time $t_w$ obtained by equation (3) and position data determined by a predetermined machining track data to the motor driver 31. As a result, the servomotors 5 and 6 are driven to control the feeding speed $F_p$ such that the desired nonload time $t_w$ can be obtained.

Figure 6A:
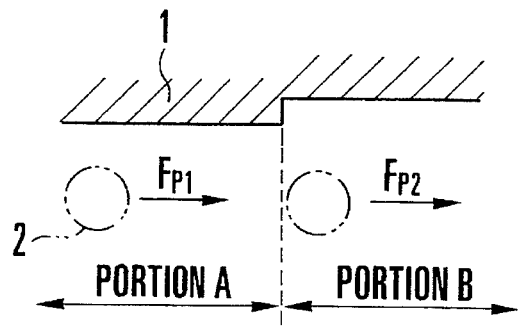
FIGS. 6A and 6B are views for explaining machining of a stepped machining surface by using the present invention.
Figure 6B:
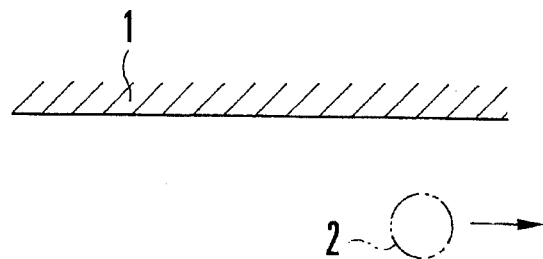

During stable electrical discharge machining, the machining gap length is generally considered as a function of a nonload time. When the nonload time is long, the machining gap length is also large. As in this embodiment, when the feeding speed is controlled in accordance with the desired nonload time $t_{wp}$, a predetermined machining gap length can be obtained. Therefore, the finished surface can be made smooth. This operation will be described with reference to FIGS. 6A and 6B. Before machining, the machining gap is relatively small at a portion A of the workpiece 1, as shown in FIG. 6A, and the nonload time also becomes short. As is apparent from FIG. 5, a feeding speed $F_{p1}$ becomes lower to increase the machining amount. On the other hand, at a portion B, the machining gap is larger, and the nonload time also becomes longer. A feeding speed $F_{p2}$ becomes higher than $F_{p1}$ to decrease the machining amount. As a result, the portion A is machined in an amount larger than that at the portion B. After machining, the workpiece 1 without any stepped portion can be obtained, as shown in FIG. 6B.

As described above, according to the present invention, control is not performed on the basis of the average voltage of interelectrode voltages, unlike the prior art. Stable servo feed machining can be performed without being influenced by variations in duty ratio (ratio of the non-load time during one period) of the interelectrode voltage. In addition, the nonload time is calculated on the basis of the discharge frequency, unlike the prior art in which the nonload time is directly counted. Therefore, the nonload time can be accurately measured even in a high-frequency area, thereby realizing stable servo feed machining.

Figure 7:
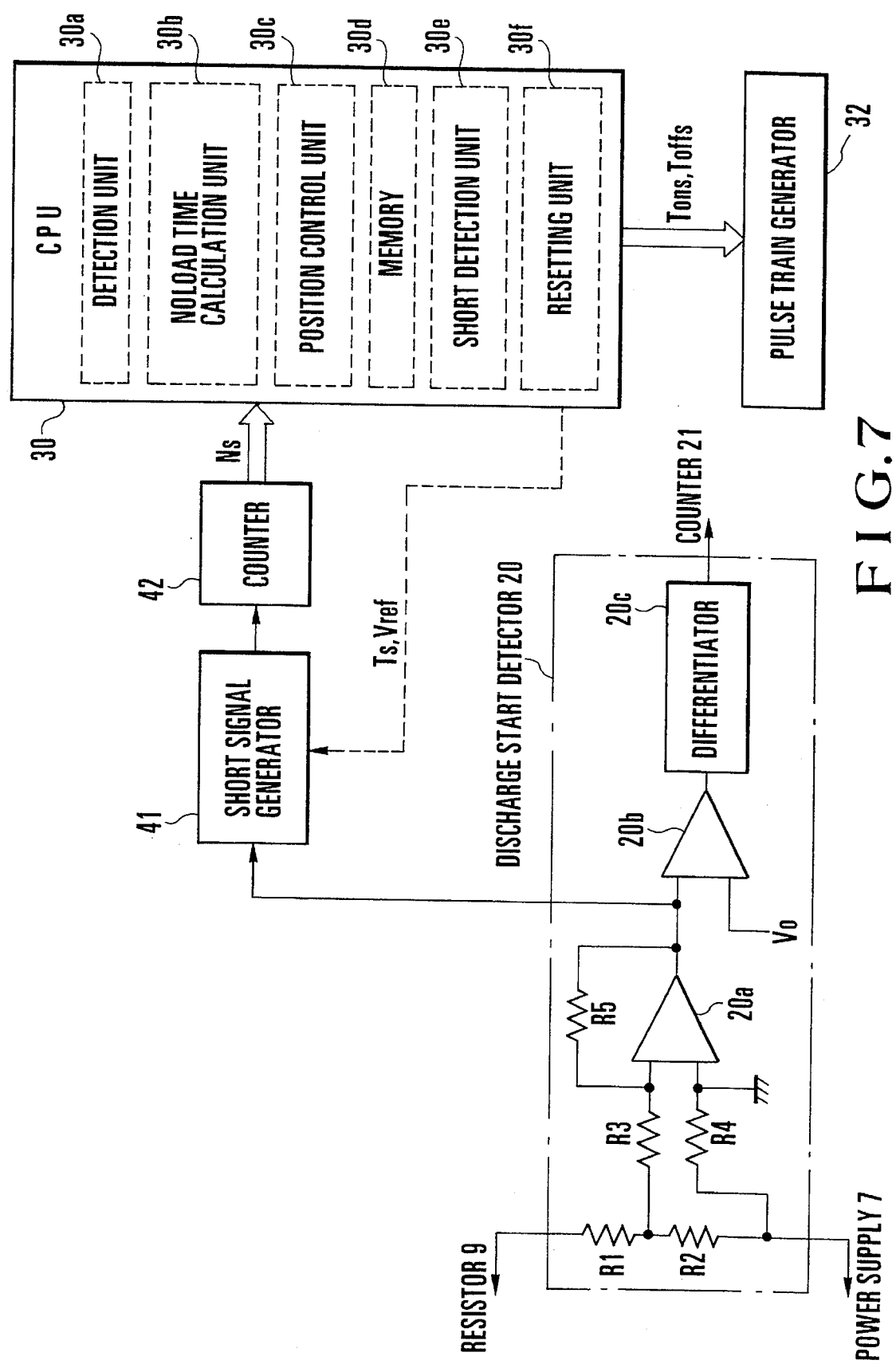
FIG. 7 is a block diagram showing the second embodiment of the present invention.

FIG. 7 shows the main part of an electrical discharge machining apparatus according to the second embodiment of the present invention. In this embodiment, a short signal generator 41 and a counter 42 are added to the apparatus of the first embodiment. In addition, a short detecting means 30e and a resetting means 30f are provided to a CPU 30. The same reference numerals as in the first embodiment denote the same constituent elements in FIG. 7, and a detailed description thereof will be omitted.

In the second embodiment, an ON time $T_{on}$ and an OFF time $T_{off}$ are newly set upon detection of a short during machining, thereby calculating a nonload time $t_w$ on the basis of the ON time $T_{on}$ and the OFF time $T_{off}$ in the shorted state.

Referring to FIG. 7, the short signal generator 41 is connected to the output side of an operational amplifier 20a of a discharge start detector 20. Before application of a regular discharge voltage to the machining gap, a low search voltage is applied. Generation of a short can be checked by the voltage value of the search voltage. More specifically, when an input voltage to the short signal generator 41 does not reach a predetermined reference voltage $V_{ref}$ within a predetermined search time $T_s$, the short signal generator 41 determines it as a short and outputs a short signal (pulse signal) to the counter 42. The short signal generator 41 is constituted by, e.g, a comparator, a pulse generator, and the like. Data such as the search time $T_s$ and the reference voltage $V_{ref}$ are supplied from the CPU 30. The counter 42 counts the number of short signals and outputs the count value $N_s$ to the CPU 30. The short detection unit 30e of the CPU 30 checks the shorted state from the value $N_s$. The resetting unit 30f accordingly determines an ON time $T_{ons}$ and an OFF time $T_{offs}$ in the shorted state with reference to a memory 30d and commands the determined times to a pulse train generator 32. On the other hand, the nonload time $t_w$ is also determined from equation (3) on the basis of the ON time $T_{ons}$ and the OFF time $T_{offs}$ in the shorted state. The manufacturing gap is then controlled as in the first embodiment.

The second embodiment has exemplified a shorted state. However, in other cases as well, when the ON time $T_{on}$ and the OFF time $T_{off}$ are changed during machining, the same processing can be performed.

As has been described above, according to the present invention, a discharge frequency during machining is detected, and a nonload time is calculated on the basis of the detection value and predetermined ON and OFF times, thereby accurately calculating the nonload time even in a high-frequency area. For this reason, in a high-frequency area for finishing or the like, stable servo feed machining can be performed.

What is claimed is:

1. An electrical discharge machining method comprising the steps of:

intermittently applying a voltage pulse to an electrical discharge machining gap between a machining electrode and a workpiece in accordance with predetermined ON and OFF times to generate a discharge;

moving said machining electrode and said workpiece relative to each other during generation of the discharge to perform electrical discharge machining of said workpiece;

detecting a discharge frequency during the electrical discharge machining;

calculating a nonload time by subtracting the predetermined ON and OFF times from a discharge repetition period obtained from a reciprocal of the detected discharge frequency, the nonload time being a time from application of the voltage pulse to the start of discharge, the ON time being a time from the start of discharge to the completion of discharge, the OFF time being a time from the completion of discharge to the next application of the voltage pulse; and controlling a relative position between said machining electrode and said workpiece on the basis of the calculated nonload time.

2. A method according to claim 1, further comprising the steps of resetting at least one of the predetermined ON and OFF times in accordance with a machining state during electrical discharge machining and calculating the nonload time again by using at least one of the reset ON and OFF times.

3. A method according to claim 2, further comprising the step of detecting a shorted state of the electrical discharge machining gap by applying a predetermined search voltage to the electrical discharge machining gap, and wherein at least one of the ON and OFF times is reset upon detection of the shorted state of the electrical discharge machining gap.

4. A method according to claim 1, wherein the step of controlling a relative position comprises the step of controlling relative movement of said machining electrode and said workpiece in accordance with a relative feeding speed determined by the calculated nonload time.

5. A method according to claim 1, further comprising the steps of detecting a short between said machining electrode and said workpiece and changing the ON and OFF times upon detection of the short.

6. An electrical discharge machining apparatus comprising:

a discharge unit for intermittently applying a voltage pulse to an electrical discharge machining gap between a machining electrode and a workpiece in accordance with predetermined ON and OFF times to generate a discharge;

moving means moving said machining electrode and said workpiece relative to each other during generation of the discharge to perform electrical discharge machining of said workpiece;

frequency detecting means detecting a discharge frequency during electrical discharge machining;

calculating means calculating a nonload time by subtracting the predetermined ON and OFF times from a discharge repetition period based on a reciprocal of the discharge frequency from said frequency detecting means, the nonload time being a time from application of the voltage pulse to the start of the discharge, the ON time being a time from the start of discharge to the completion of discharge, the OFF time being a time from the completion of discharge to the next application of a voltage pulse; and position control means controlling a relative position between said machining electrode and said workpiece by driving said moving means on the basis of the nonload time determined from said calculating means.

7. An apparatus according to claim 6 further comprising a central processing unit, with said position control means being a position control unit of said central processing unit.

8. An apparatus according to claim 6, further comprising memory means storing the predetermined ON and OFF times, and wherein said calculating means reads out the ON and OFF times from said memory means to calculate the nonload time.

9. An apparatus according to claim 6, further comprising discharge start detecting means detecting the start of discharge on the basis of an interelectrode voltage generated in the electrical discharge machining gap between said machining electrode and said workpiece, and counting means for counting a discharge start signal from said discharge start detecting means, and wherein said frequency detecting means divides a count value from said counting means at a predetermined sampling period to obtain the discharge frequency.

10. An apparatus according to claim 6, wherein said position control means controls relative movement of said machining electrode and said workpiece in accordance with a relative feeding speed determined by the nonload time from the calculating means.

11. An apparatus according to claim 6, further comprising resetting means resetting at least one of the predetermined ON and OFF times in accordance with a machining state during electrical discharge machining, and wherein said calculating means uses at least the one of the ON and OFF times reset by said resetting means to calculate the nonload time.

12. An apparatus according to claim 11, further comprising short detecting means applying a predetermined search voltage to the electrical discharge machining gap between said machining electrode and said workpiece to detect a shorted state of the electrical discharge machining gap, and wherein said resetting means resets at least the one of the ON and OFF times upon detection of the shorted state of the electrical discharge machining gap.

13. An apparatus according to claim 6, wherein said moving means are servomotors.

14. An apparatus according to claim 6 further comprising a central processing unit, with said frequency detecting means being a frequency detecting unit of said central processing unit.

15. An apparatus according to claim 6 further comprising a central processing unit, with said calculating means being a nonload time calculating unit of said central processing unit.

* * * * *